United States Patent

Whittley

[11] Patent Number: 5,293,394
[45] Date of Patent: Mar. 8, 1994

[54] RAMAN LASER

[75] Inventor: Stewart T. Whittley, Edinburgh, United Kingdom

[73] Assignee: GEC Ferranti Defence Systems Limited, Stanmore, United Kingdom

[21] Appl. No.: 913,664

[22] Filed: Jul. 16, 1992

[30] Foreign Application Priority Data

Jul. 18, 1991 [GB] United Kingdom ............... 9115556

[51] Int. Cl.5 ............................................. H01S 3/30
[52] U.S. Cl. .................................... 372/3; 359/327
[58] Field of Search .................. 372/3, 99; 359/327

[56] References Cited

U.S. PATENT DOCUMENTS

| | | | |
|---|---|---|---|
| 3,881,115 | 4/1975 | Hodgson et al. | 372/3 |
| 4,254,348 | 3/1981 | Stappaerts . | |
| 4,280,109 | 7/1981 | Staepperts | 372/3 |
| 4,394,623 | 7/1983 | Kurnit . | |
| 4,570,081 | 2/1986 | Baldwin . | |
| 4,575,645 | 3/1986 | Komine . | |
| 4,618,783 | 10/1986 | Pradere et al. | 372/3 |
| 4,633,103 | 12/1986 | Hyman et al. . | |
| 5,090,016 | 2/1992 | Dewhirst et al. | 359/327 |
| 5,142,645 | 8/1992 | Katz | 372/3 |

FOREIGN PATENT DOCUMENTS

| | | |
|---|---|---|
| 0393528 | 10/1990 | European Pat. Off. . |
| 0444435 | 9/1991 | European Pat. Off. . |
| 1102797 | 2/1968 | United Kingdom . |
| 1210597 | 10/1970 | United Kingdom . |
| 1418299 | 12/1975 | United Kingdom . |
| 1488605 | 9/1976 | United Kingdom . |
| 2233491 | 1/1991 | United Kingdom . |

OTHER PUBLICATIONS

Applied Physics B: Photo-Physics and Laser Chemistry vol. B52, No. 3, Mar. 1991, Berlin pp. 211-216, S. Kawasaki et al. "Efficiently Generated Rotational and Vibrational Stimulated Raman Emission by Means of a Two-Color Laser Beam".

Optics Communications, vol. 22, No. 3, Sep. 1977, pp. 323-328 A. Owyoung, "Sensitivity Limitations for CW Stimulated Raman Spectroscopy".

Japanese Journal of Applied Physics, vol. 30, No. 2B, Feb. 15, 1991 pp. L283-L285, S. Yoshikawa et al., "Equally Spaced Multi-Frequency Laser Emission Generated by Two-Color Stimulated Raman Effect.—Enhancement of Rotational Lines and Suppression of Vibrational Lines".

*Primary Examiner*—Rodney B. Bovernick
*Assistant Examiner*—Robert E. Wise
*Attorney, Agent, or Firm*—Spencer, Frank & Schneider

[57] ABSTRACT

This invention provides a Raman laser wherein a light beam from a laser source (1) passes through a first chamber (3) and experiences Raman scattering, and then passes through a second chamber (9) and experiences further Raman scattering, such that the output of the Raman laser is frequency shifted. The first and second chambers may be distinct from each other enabling different types and pressures of gases to be utilised, or may be one and the same (20) providing a particularly compact arrangement. A Raman laser in accordance with the invention is particularly suitable for the production of light consisting of multiple rotational Raman orders, and particular embodiments enable frequency switching to be achieved and also provides arrangements which reduce the problems of boresight stability and gas circulation encountered with previous designs.

24 Claims, 1 Drawing Sheet

RAMAN LASER

BACKGROUND OF THE INVENTION

This invention relates to a Raman laser and in particular but not exclusively a Raman laser for producing multiple rotational Raman orders.

There are only certain materials or combinations of materials convenient for use in a laser, and consequently only a limited number of wavelength bands which can conveniently be obtained by lasing action and each of these is usually narrow. In certain applications it is desirable to use other frequencies, to be able to switch between different frequencies, or to broaden the frequency spectrum of the band.

In 1928 Sir Chandrasekhara Vankata Raman observed an effect now known as Raman scattering. This occurs when energy in the form of photons incident on a molecular structure raises the energy state of a molecule to an intermediate, or virtual state, from which it makes a Stokes transition emitting a photon of energy, termed a scattered photon. The scattered photon may have the same energy as the incident photon or alternatively a higher or lower energy. To have a higher or lower energy the energy value of the molecule must have changed. The molecule can obtain or release this energy in the form of vibrational or rotational energy. Because distinct vibrational and rotational energy levels exist scattered photons also have distinct energy values and therefore the incident beam of photons is in effect frequency shifted by "scattering". This effect is most commonly achieved using molecular gases such as $H_2$, $D_2$, $CH_4$ or $CO_2$, which are commonly referred to as being Raman active.

Raman scattered light consists of vibrationally scattered and rotationally scattered components which are side bands of the incident laser frequency. The molecule has a larger separation between vibrational energy states than rotational energy states and thus "vibrational shifts" in frequency are greater than "rotational shifts" in frequency. One of the prime uses of the Raman effect has so far been in analytical chemistry whereby the change in frequency gives an indication of the energy level structure of a molecule.

The most efficient conversion of light using the Raman effect requires that a laser beam incident on the molecular gas is above the threshold intensity for stimulated Raman scattering (SRS). When moderate powered lasers are employed Raman scattering can be enhanced by focusing the pump beam in the gas by means of lenses or mirrors. However the use of focusing optics makes it difficult to maintain boresight stability as movement of these optics will deflect the beam.

SUMMARY OF THE INVENTION

According to a first aspect of the present invention there is provided a Raman laser comprising a first and a second chamber each containing a Raman active gas, wherein the first chamber is arranged to receive an incident coherent pump beam which experiences forward Raman scattering on passing through the first chamber, and wherein the second chamber is arranged to receive an output beam from the first chamber which experiences further forward Raman scattering on passing through the second chamber the Raman laser further comprising a steering optic by which the pump beam entering the first chamber, and the Raman shifted beam exiting the second chamber are deflected.

By forward Raman scattering it is meant that the beam passes through the chamber once on each pass as opposed to experiencing recursive Raman scattering. The Raman laser beam is generated by SRS in the same direction as the pump laser beam. Since scattering is in the forward direction the Raman gain is insensitive to the pump laser linewidth suiting the Raman device to a wide range of lasers.

By employing a Raman laser in accordance with the first aspect of the present invention the incident input beam and output beam are deflected by the same optical element, the steering optic. This can be suitably arranged such that the Raman laser is insensitive to small deviations in the incident beam direction and also so that the exact orientation of the laser is immaterial to the incident and output beams remaining parallel. Preferably the steering optic has two reflective faces arranged orthogonal to each other the first reflecting the incedent pump beam to the first chamber and the second receiving the output beam from the second chamber and reflecting it in the same direction as the incident beam.

Advantageously the steering optic is arranged to be oscillated in use such as to cause the beams passing through the chambers to move within the chambers, and the output beam deflected by the steering optic to remain stationary. This provides a means of oscillating the beam within the chambers such as to prevent hot spots developing in the gas contained within the chambers, within areas of high intensity light. Because heat changes the density and refractive incidence of the gas, the gas defocuses the light passing through the Raman laser if hot spots occur. Therefore by employing such an oscillated steering optic the necessity to provide a device for circulating the gas within the chamber, used with previous designs, is eliminated as are the problems associated with providing a device for circulating the gas within a sealed chamber.

In some applications it is advantageous if the steering optic can be displaced into and out of the incident beam such that an output beam from the Raman laser can be switched from the pump beam frequency to the Raman shifted frequency. This provides a way of easily switching the output frequency between that of the pump beam and that of the Raman shifted frequency.

In accordance with a second aspect of the invention there is provided a Raman laser comprising a first and a second chamber each containing a Raman active gas, the first chamber being arranged to receive a coherent pump beam which experiences forward Raman scattering on passing through the first chamber, and the second chamber being arranged to receive an output beam from the first chamber which experiences further forward Raman scattering on passing through the second chamber, the Raman laser further comprising a filter between the first and second chambers which is transmissive to rotationally scattered Raman radiation and the pump beam, and is non-transmissive to vibrationally scattered Raman radiation. Employing this aspect of the invention encourages a greater proportion of rotational scattering in the second chamber as the rotationally scattered light from the first chamber is of the correct nature to stimulate rotational scattering in the second chamber. Preventing the vibrational scattered component from entering the second chamber reduces or eliminates "seeded" generation of vibrational scattering in the second chamber and therefore encourages multiple rotational orders.

In accordance with a third aspect of the invention there is provided a Raman laser comprising a first and a second chamber each containing a Raman active gas, the first chamber being arranged to receive a coherent pump beam which experiences forward Raman scattering on passing through the first chamber, and the second chamber being arranged to receive an output from the first chamber which experiences further forward Raman scattering on passing through the second chamber, the Raman laser further comprising a device for circularly polarising the pump beam incident on the first chamber, and altering the polarisation of the beam emerging from the first chamber such that it enters the second chamber elliptically polarised. By employing the third aspect of the invention rotational scattering is encouraged because circularly polarised light favours rotational scattering to vibrational scattering. Thus the rotational output from the first chamber is enhanced. The rotationally scattered light from this first chamber is of the correct nature to stimulate rotational Raman scattering in the second chamber and the conversion of the beam to the elliptically polarised beam provides a linearly polarised component which takes part in a four wave mixing process (FWM), described below with reference to the accompanying drawings. This process is only possible when a linearly polarised component is present. This process produces multiple Stoke and anti-Stokes Raman orders providing a broader frequency spectrum.

The change in polarisation between the two chambers is preferably achieved by a double reflection which takes places in a corner cube arrangement, this corner cube arrangement also serving to reflect the beam back through the second chamber parallel to the first.

It is advantageous if any two, or all three of the aspects of the invention, or combination thereof, described above are combined together in a single Raman laser.

It is advantageous if in accordance with any aspect of the invention the first and second chambers are parallel to each other and further comprising a reflector arranged to receive radiation emerging from the first chamber and reflect it through the second chamber parallel to the radiation in the first chamber, and preferably this reflector arrangement comprises a corner cube.

In accordance with any aspect of the invention it can be advantageous if the two chambers are distinct from one another, enabling different gases or different gas pressures to be used in each chamber. Alternatively it can be advantageous if the two chambers are one and the same chamber wherein the beam emerging from the chamber is deflected back through the chamber in the opposite direction. This arrangement eliminates the need to have two chambers separately controlled.

The invention will now be described by way of example only, with reference to the following drawings, in which like reference numerals for like parts are used throughout, and in which:

DETAILED DESCRIPTION OF THE DRAWINGS

Figure 1:
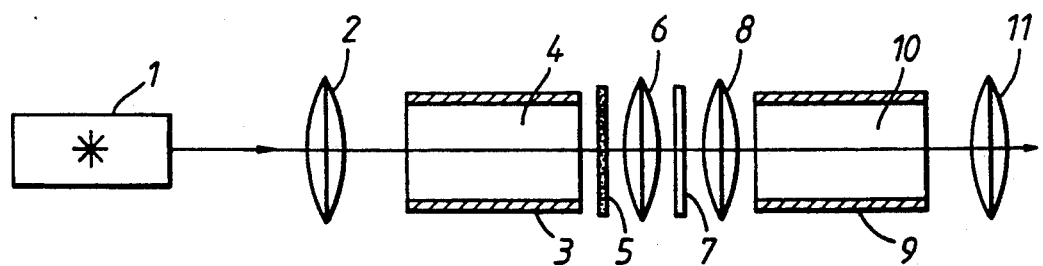
FIG. 1 schematically illustrates a first Raman laser arrangement in accordance with the invention.

Referring to FIG. 1 a circularly or near circularly polarised beam from a laser source 1 is incident on a focusing optic 2 which focuses the radiation within a first chamber 3 of the Raman laser containing a volume of Raman active gas 4. Light leaving the first chamber 3 passes through a filter 5 and a second lens 6, the lenses 2 and 6 being afocal making the net optical power zero. The light then passes through the quarter wave-plate 7, a first lens 8, a second chamber 9 filled with a second volume of gas 10, before leaving through the second lens 11. Again lenses 7 and 11 associated with the second chamber 9 are afocal. (It is possible that lenses 6 and 8 could be combined in one single more powerful lens).

A substantially circularly polarised beam from the source 1 is focused by the lens 2 in the Raman active gas 4 contained in the chamber 3 such that the intensity of radiation is sufficient to overcome the required threshold value for stimulated rotational Raman scattering to occur. Because the incident beam is substantially circularly polarised, and the pressure of the gas 4 is maintained at a relatively low pressure, considerable rotational Raman scattering occurs.

Light leaving the chamber 3 passes through the filter 5 which only permits those frequencies to pass which have been generated by rotational Raman scattering. The lens 6 refocuses the radiation before it passes through a quarter wave-plate 7. This causes the beam to become more elliptically polarised and the beam is then focused by lens 8 in the gas 10 contained within chamber 9. In chamber 9 the linearly polarised component of the elliptically polarised beam takes part in a FWM process where multiple Stokes and anti-Stokes rotational transitions are made generating multiple rotational Raman orders. This process is possible when the beam has both components of incident wavelength and wavelengths generated by rotational Raman scattering. Because the filter 5 has removed frequencies corresponding to vibrational Raman scatting the gain due to rotational Raman scattering in the chamber 9 exceeds the gain due to vibrational scattering, and the output consists primarily of multiple rotational Raman orders.

Figure 2:
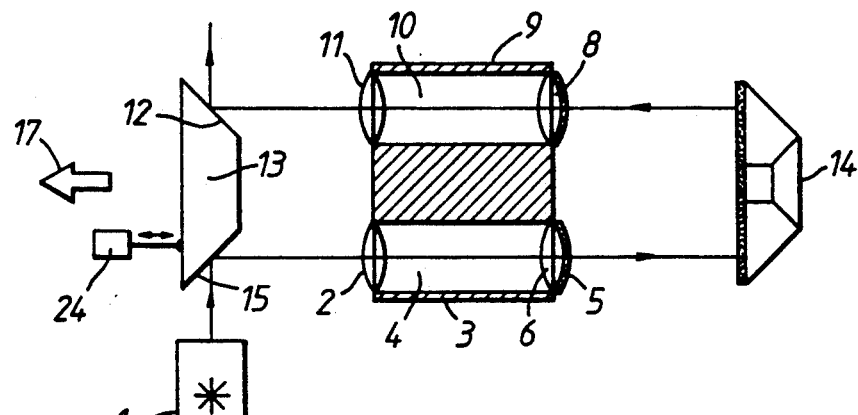
FIG. 2 schematically illustrates a second Raman laser arrangement in accordance with the invention.

FIG. 2 illustrates a modification of the apparatus illustrated in FIG. 1. In this embodiment light from the source 1 is deflected by planar surface 15 of steering optic 13 into the first chamber 3. In this arrangement the chamber 3 is sealed by the lenses 2 and 6, but otherwise the chamber performs the same function as in the FIG. 1 arrangement. In the FIG. 2 arrangement filtering is achieved by a coating applied to lenses 6, 8 and corner cube 14 and the incident, substantially circularly polarised light beam is converted to elliptically polarised light during the two total internal reflections it experiences on passing through the corner cube 14. The light then passes through chamber 9 which performs the same function as in the FIG. 1 arrangement. The beam is then deflected off a second planar surface 12 of the steering optic 13 in a direction co-linear with the original incident beam. In employing this arrangement the alignment of the chambers 3 and 9 and the corner cube 14 are not critical for even if these deviate slightly from the position shown the output beam will still be co-linear with the input beam, provided chambers 3 and 9 are rigidly fixed together. Furthermore if it is wished to switch the output beam 16 between having a modified frequency and a frequency of the incident beam, then this is achieved by displacing the steering optic in the direction of the arrow 17 by any suitable conventional type of actuator (not shown). The steering optic 13 when in the position shown, is oscillated further by actuator 24 such that the focal point of the beam formed by lenses 2 and 8 within the chambers 3 and 9 is moved between laser shots so preventing the generation of hot spots within the gas.

Figure 3:
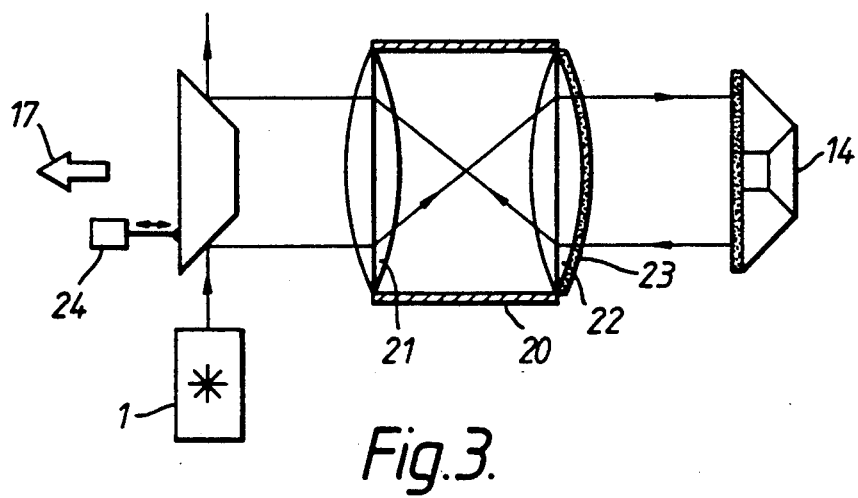
FIG. 3 schematically illustrates a third Raman laser arrangement in accordance with the invention.

FIG. 3 depicts a particularly advantageous arrangement wherein the functions of the first and second chamber of FIGS. 1 and 2 are performed by the single chamber 20. Only two lens elements 21 and 22 are required and one filter element 23. Again the steering optic 13 can be moved in the direction of arrow 17 to perform the switching function and in use is oscillated by actuator 24 in the same manner as described with reference to FIG. 2 above.

Although the FIGS. 2 and 3 arrangements have been described with reference to the production of multiple Raman orders, it will be appreciated that by removing the filtering components a conventional Ramar laser function may be performed with the advantages that an arrangement is provided in which the alignment of the chamber or chambers is not critical, the beam can be switched, and defocusing of the beam can be avoided while oscillating the input beam to avoid the generation of hot spots within the chamber or chambers.

What I claim is:

1. A Raman laser comprising a first and a second chamber each containing a Raman active gas, wherein the first chamber is arranged to receive an incident coherent pump beam which experiences forward Raman scattering on passing through the first chamber, and wherein the second chamber is arranged to receive an output beam from the first chamber which experiences further forward Raman scattering on passing through the second chamber, the Raman laser further comprising a steering optic by which the pump beam entering the first chamber, and the Raman shifted beam exiting the second chamber are deflected.

2. A Raman laser as claimed in claim 1 wherein the steering optic has two reflective faces arranged orthogonal to each other, the first reflecting the incident pump beam to the first chamber, and the second receiving the output beam from the second chamber and reflecting it in the same direction as the incident beam.

3. A Raman laser as claimed in claim 2, comprising means for displacing the steering optic into and out of the incident beam such that an output beam from the Raman laser can be switched from the pump beam frequency to the Raman shifted frequency.

4. A Raman laser as claimed in claim 1 wherein the steering optic is arranged to be oscillated in use such as to cause the beams passing through the chambers to move within the chambers, and the output beam deflected by the steering optic to remain stationary.

5. A Raman laser as claimed in claim 1 further comprising a filter between the first and second chambers which is transmissive to rotationally scattered Raman radiation and the pump beam, and is substantially non-transmissive to vibrationally scattered Raman radiation.

6. A Raman laser as claimed in claim 1 further comprising means for circularly polarising the pump beam incident on the first chamber, and altering the polarisation of the beam emerging from the first chamber such that it enters the second chamber elliptically polarised.

7. A Raman laser as claimed in claim 6 wherein the polarisation is altered between chambers by a corner-cube reflector.

8. A Raman laser as claimed in claim 1 wherein the first and second chambers are parallel to each other, and further comprise a reflector to receive radiation emerging from the first chamber and reflect it through the second chamber, parallel to the beam in the first chamber.

9. A Raman laser as claimed in claim 8 wherein the reflector arrangement comprises a corner-cube.

10. A Raman laser as claimed in claim 1 wherein the two chamber are distinct from one another.

11. A Raman laser as claimed in claim 1 wherein the two chambers are one and the same chamber and wherein the beam on first emerging from the chamber is deflected back through the chamber in the opposite direction.

12. A Raman laser comprising a first and second chamber each containing a Raman active gas, the first chamber being arranged to receive a coherent pump beam which experiences forward Raman scattering on passing through the first chamber, and the second chamber being arranged to receive an output beam from the first chamber which experiences further forward Raman scattering on passing through the second chamber, the Raman laser further comprising a filter between the first and second chambers which is transmissive to rotationally scattered Raman radiation and the pump beam, and is substantially non-transmissive to vibrationally scattered Raman radiation.

13. A Raman laser as claimed in claim 12 further comprising means for circularly polarising the pump beam incident on the first chamber, and altering the polarisation of the beam emerging from the first chamber such that it enters the second chamber elliptically polarised.

14. A Raman laser as claimed in claim 12 wherein the first and second chambers are parallel to each other, and further comprise a reflector to receive radiation emerging from the first chamber and reflect it through the second chamber, parallel to the beam in the first chamber.

15. A Raman laser is claimed in claim 14 wherein the reflector arrangement comprises a corner-cube.

16. A Raman laser as claimed in claim 14 wherein the filter as in the form of a surface coating on the reflector arrangement.

17. A Raman laser as claimed in claim 12 wherein the two chambers are distinct from one another.

18. A Raman laser as claimed in claim 12 wherein the two chambers are one and the same chamber and wherein the beam on first emerging from the chamber is deflected back through the chamber in the opposite direction.

19. A Raman laser as claimed in claim 12 further comprising means for circularly polarising the pump beam incident on the first chamber, and altering the polarisation of the beam emerging from the first chamber such that it enters the second chamber elliptically polarised.

20. A Raman laser comprising a first and second chamber each containing a Raman active gas, the first chamber being arranged to receive a coherent pump beam which experiences forward Raman scattering on passing through the first chamber, and the second chamber being arranged to receive an output from the first chamber which experiences further forward Raman scattering on passing through the second chamber, the Raman laser further comprising means for circularly polarising the pump beam incident on the first chamber, and altering the polarisation of the beam emerging from the first chamber such that it enters the second chamber elliptically polarised.

21. A Raman laser as claimed in claim 20 wherein the first and second chambers are parallel to each other, and further comprise a reflector arranged to receive radiation emerging from the first chamber and reflect it through the second chamber, parallel to the beam in the first chamber.

22. A Raman laser as claimed in claim 21 wherein the reflector arrangement comprises a corner-cube.

23. A Raman laser as claimed in claim 20 wherein the two chambers are distinct from one another.

24. A Raman laser as claimed in claim 20 wherein the two chambers are one and the same chamber and wherein the beam on first emerging from the chamber is deflected back through the chamber in the opposite direction.

* * * * *